(12) United States Patent
O'Sullivan et al.

(10) Patent No.: US 8,122,091 B2
(45) Date of Patent: Feb. 21, 2012

(54) SYSTEM AND METHOD FOR NAME RESOLUTION

(75) Inventors: Patrick Joseph O'Sullivan, Ballsbridge (IE); Liam Harpur, Skerries (IE); Fred Raguillat, Dunboyne (IR); Carol Sue Zimmet, Boxborough, MA (US); Daniel Terlizzi, Arezzo (IT)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 11/967,872

(22) Filed: Dec. 31, 2007

(65) Prior Publication Data
US 2009/0171904 A1 Jul. 2, 2009

(51) Int. Cl.
*G06F 15/16* (2006.01)
*G06F 15/173* (2006.01)

(52) U.S. Cl. ........ 709/206; 709/204; 709/205; 709/207; 709/223; 709/224

(58) Field of Classification Search .................. 709/206, 709/204, 205, 207, 223, 224
See application file for complete search history.

(56) References Cited

U.S. PATENT DOCUMENTS

| | | | |
|---|---|---|---|
| 6,829,607 B1 * | 12/2004 | Tafoya et al. | 1/1 |
| 7,213,206 B2 * | 5/2007 | Fogg | 715/706 |
| 2003/0158855 A1 * | 8/2003 | Farnham et al. | 707/102 |
| 2003/0167324 A1 * | 9/2003 | Farnham et al. | 709/224 |
| 2007/0038594 A1 * | 2/2007 | Goodwin et al. | 707/2 |
| 2007/0115991 A1 * | 5/2007 | Ramani et al. | 370/392 |
| 2009/0319466 A1 * | 12/2009 | Liu et al. | 706/54 |

* cited by examiner

*Primary Examiner* — Karen Tang
(74) *Attorney, Agent, or Firm* — Steven L. Nichols; Van Cott, Bagley, Cornwall & McCarthy P.C.

(57) ABSTRACT

A plurality of relationships of a user are analyzed. A social network of the user based upon, at least in part, the plurality of relationships of the user, is analyzed, the social network identifying one or more relationship users. A collaborative user is identified based upon, at least in part, a name input received from the user and the social network of the user.

16 Claims, 6 Drawing Sheets

| name (152) | email (154) | IM (156) | weighting (158) |
|---|---|---|---|
| John Smith | user48@xyz.com | user 48IM | 8 |
| Matt Barclay | user50@xyz.com | user 50IM | 7 |
| Mitch Burkhard | user52@xyz.com | user 52IM | 7 |
| Matt Herbert | matth@xyz.com | matt IM | 5 |

SYSTEM AND METHOD FOR NAME RESOLUTION

BACKGROUND OF THE INVENTION

This disclosure generally relates to name resolution in collaborative applications, and more particularly relates to name resolution using social networks.

Many electronic collaboration systems exist, such as email and instant messaging, which facilitate communication and collaboration between individuals within the same office, as well as across the globe. The ability to provide such communication relies on, in part, every individual having a unique identifier, or "messaging name", such as an email address or instant messaging identification, allowing messages to be directed to the desired individual. However, inherent in the use of unique messaging names is the requirement that a sender of a message know the unique messaging name of the specifically desired recipient. Such unique messaging names are often in opposition to the manner in which people verbally address one another, and even to how they think of one another. When John Doe is verbally asking Frank Doe a question he does not start the question with "Hello Frank Doe" or "Hello Frank Doe of the sales department of the Company X office in Ireland". On the basis that John knows Frank, John would simply call Frank by his first name. Such metaphors are missing in messaging systems, as well as other collaborative applications, such as calendaring/scheduling systems and the like.

Similar problems arise when writing an email or sending an instant message and the sender is unsure of the correct recipient. Existing methods, such as "type-ahead" functionality, may allow a sender to type the recipient's name, and based on an alphabetic look-up on name directories, or based on recently used names, the messaging system may suggest a possible recipient. Type-ahead functionality using alphabetic look-up functionality or recently used names is sometimes not useful when looking for a recipient. For example if Tom is sending an email to some colleagues that he has dealt with previously on discussion forums and in some previous emails, namely to Liam, Fred, and John. Unfortunately, Tom has forgotten John's surname. The type-ahead functionality gives too many possible users with the given name "John". Therefore, even though Tom has interacted with John in the past, if John does not exist as a recently used contact, the type-ahead functionality is unable to resolve to which John Tom wishes to send an email.

BRIEF SUMMARY OF THE INVENTION

According to a first implementation, a method includes analyzing a plurality of relationships of a user. A social network of the user based upon, at least in part, the plurality of relationships of the user, is analyzed, the social network identifying one or more relationship users. A collaborative user is identified based upon, at least in part, a name input received from the user and the social network of the user.

According to another implementation, a computer program product resides on a computer readable medium that has a plurality of instructions stored on it. When executed by a processor, the instructions cause the processor to perform operations including analyzing a plurality of relationships of a user. A social network of the user based upon, at least in part, the plurality of relationships of the user, is analyzed, the social network identifying one or more relationship users. A collaborative user is identified based upon, at least in part, a name input received from the user and the social network of the user.

BRIEF DESCRIPTION OF THE SEVERAL VIEWS OF THE DRAWINGS

FIG. 3 diagrammatically depicts a social network defined for a user by the name resolution process of FIG. 1.

DETAILED DESCRIPTION OF THE INVENTION

Figure 1:
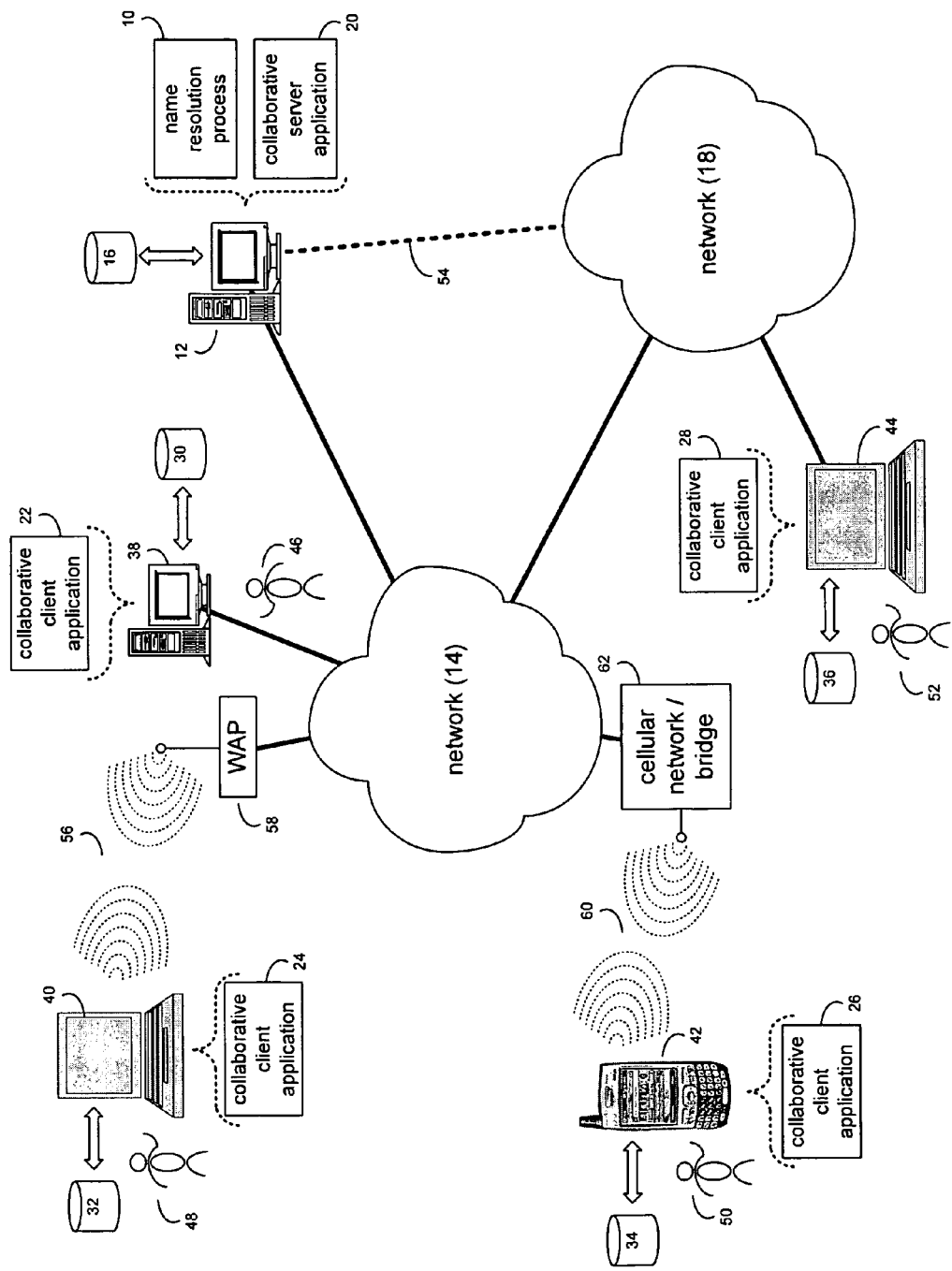
FIG. 1 is a diagrammatic view of a name resolution process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown name resolution process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Redhat® Linux®, for example (Microsoft and Windows are registered trademarks of Microsoft Corporation in the United States, other countries or both; Novell and NetWare are registered trademarks of Novell Corporation in the United States, other countries or both; Redhat is a registered trademark of RedHat Corporation in the United States, other countries or both; and Linux is a registered trademark of Linus Torvales in the United States, other countries or both. Alternatively, name resolution process 10 may reside on and be executed, in whole or in part, by a client electronic device, such as a personal computer, notebook computer, personal digital assistant, or the like.

As will be discussed below in greater detail, name resolution process 10 may analyze a plurality of relationships of a user, including, but not limited to, email communications, instant messaging chats, scheduling/calendaring events, and other collaborative interactions. A social network for the user based upon, at least in part, the plurality of relationships of the user, is analyzed. The social network may identify one or more relationship users (e.g., users involved in one or more of the relationships) based upon, at least in part, a name input received from the user and the social network of the user.

The instruction sets and subroutines of name resolution process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver, or Apache Webserver, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server application, e.g., collaborative server application 20. Examples of collaborative server application 20 may include, but are not limited to, email server applications that may include calendaring/scheduling functionality (e.g., IBM® Lotus® Domino® Server and Microsoft Exchange® Server), instant messaging server applications (e.g., Lotus Sametime®, Microsoft Office Live Communications Server, Jabber XCP™, and AOL® Instant Messenger®), voice-over IP server applications or PBX telephone systems, and text messaging application (short message service applications). IBM, Lotus, Domino and Sametime are registered trademarks of International Business Machines Corporation in the United States, other countries or both; Exchange is a registered trademark of Microsoft Corporation in the United States, other countries or both; and AOL and Instant Messenger are registered trademarks of America Online Corporation in the United States, other countries or both. Collaborative server application 20 may interact with collaborative client applications 22, 24, 26, 28, examples of which may include, but are not limited to, email client applications that may include calendar and/or scheduling modules (e.g., Lotus Notes and Microsoft Outlook), instant messaging client applications (e.g., AOL Instant Messenger, IBM Lotus Sametime, Google® Talk), voice over IP client applications, softphone applications, smart answering machine, text messaging (short message service) client applications (Google is a registered trademark of Google Corporation in the United States, other countries or both). Name resolution process 10 may be a stand alone application that interfaces with collaborative server application 20 or may be an applet/application that is executed within collaborative server application 20.

The instruction sets and subroutines of collaborative server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the name resolution process may be a client-side application (not shown) residing on one or more storage device (e.g., stored on storage device 30, 32, 34, 36) coupled to one or more client electronic device (e.g., client electronic devices 38, 40, 42, 44, respectively). As such, the name resolution process may be a stand alone application that interfaces with an application (e.g., collaborative client applications 22, 24, 26, 28), or may be an applet/application that is executed within an application (e.g., collaborative client applications 22, 24, 26, 28). As such, the name resolution process may be a client-side process, a server-based process, or a hybrid client-side/server-based process, which may be executed, in whole or in part, by server computer 12, or one or more of client electronic device 38, 40, 42, 44.

The instruction sets and subroutines of collaborative client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using collaborative client applications 22, 24, 26, 28, users 46, 48, 50, 52 may, for example, access collaborative server application 20 and may, e.g., conduct email communications, schedule/manage calendar events, conduct instant messaging communications, conduct voice communications, browse the internet, access online collaborative websites and resources (e.g., team spaces) and the like.

Users 46, 48, 50, 52 may access collaborative server application 20 directly through the device on which the client application (e.g., collaborative client applications 22, 24, 26, 28) is executed, namely client electronic devices 38, 40, 42, 44, for example. Users 46, 48, 50, 52 may access collaborative server application 20 directly through network 14 or through secondary network 18. Users 46, 48, 50, 52 may access collaborative server application 20 directly through network 14 or through secondary network 18. Further, server computer 12 (i.e., the computer that executes collaborative server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE, Redhat Linux, or a custom operating system.

Figure 2:
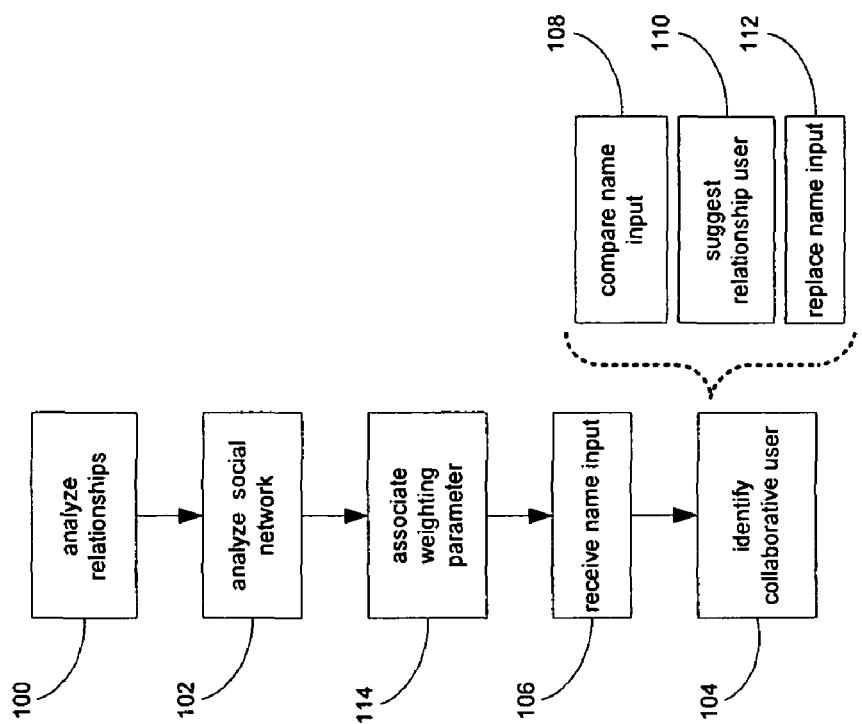
FIG. 2 is a flowchart of a process executed by the name resolution process of FIG. 1.

Referring also to FIG. 2, name resolution process 10 may analyze 100 a plurality of relationships of a user. Name resolution process 10 may further analyze 102 a social network of the user based upon, at least in part, the plurality of relationships of the user. The social network of the user may identify one or more relationship users. A collaborative user may be identified 104 based upon, at least in part, a name input received from the user and the social network of the user. In this manner, name resolution process 10 may resolve a name input from the user to provide a most likely intended collaborative user based upon, at least in part, the social network of the user.

The plurality of relationships may include one or more of: email communications, instant messaging chats, voice communications, scheduled calendar events, and collaborative space interactions (e.g., a web-based, collaborative workspace for managing shared work processes and maintaining shared artifacts in a project). Continuing with the example of FIG. 1, user 46 may send and/or receive an email from user 48. Additionally, user 46 may conduct an instant messaging chat with user 50. User 46 may schedule a meeting with user 52. The scheduled meeting with user 52 may be explicit (e.g., a meeting may be scheduled between user 46 and user 52, or user 46 may accept a meeting schedule from user 52) or may be implicit (e.g., user 46 and user 52 may each be scheduled for a meeting at the same time and place). Furthermore, user 46 may initiate and/or receive a telephone call from another user (e.g., which may be logged by an enterprise telephone system or a caller ID system/module). Users 46, 48, and 50 may also take a business trip together (e.g., evidenced based on group travel arrangements, commonly scheduled events in a calendar application, or the like).

User 46 may use/access one or more collaborative client applications (e.g., relationship client application 22) and/or collaborative server applications (e.g., collaborative server application 20). Continuing with the above-stated example, user 46 may send/receive the email from user 48 via an email application. Similarly, user 46 may conduct the instant messaging chat with user 50 via an instant messaging application. User 46 may initiate/receive a telephone call via a voice communication application, and may schedule a meeting with user 52 via a calendar/scheduling application.

A social network of the user may be based upon, at least in part, the plurality of relationships of user 46 (e.g., email communications with user 48, instant messaging chats with user 50, scheduled meetings with user 52, etc.). The social network may identify one or more of the various users (i.e., user 48, user 50, user 52) with whom user 46 has a relationship. Name resolution process 10 may analyze 102 a social network of user 46 including those individuals with whom user 46 interacts using collaborative server application 20 and/or collaborative client application 22. The social network analyzed 102 may be, for example, maintained as a table, graph, listing, database, or the like.

For example, and referring to FIG. 3, social network graph 150 for user 46 is diagrammatically depicted. The diagrammatic depiction of social network graph 150 is intended for illustrative purposes only, and is not intended as a limitation of the disclosure, as the social network may be structured and/or defined in various manners. As shown, social network graph 150 may include a listing of the various relationship users (e.g., user 48, user 50, and user 52, for illustrative purposes). Social network graph 150 may correlate the names 152 of the various relationship users (e.g., John Smith, Matt Barclay, Mitch Burkhard, and Matt Herbert, respectively) with various identifiers, such as email addresses 154, instant messaging ID 156, and the like. Social network graph 150 may include various additional information, such as additional identifiers (e.g., telephone number, alternative email addresses, online usernames, and the like). Additionally, social network graph 150 may include weighting parameter 158 which may be based upon, at least in part, a frequency of interaction (e.g., one email a week versus ten emails a day), mode of interaction (e.g., predominantly email, some voice, infrequent instant messaging), organizational structure, and the like. The nature and quantity of additional information maintained in social network graph 150 may vary depending upon user preference and design criteria.

Collaborative server application 20 and/or collaborative client application 22 may allow user 46 to interact with one or more collaborative users. Generally, a collaborative user may be any user that may be interacted with using collaborative server application 20 and/or collaborative client application 22. For example, the collaborative user may include one or more of an email recipient, an instant messaging recipient, and a calendaring/scheduling participant, or the like.

Figure 4:
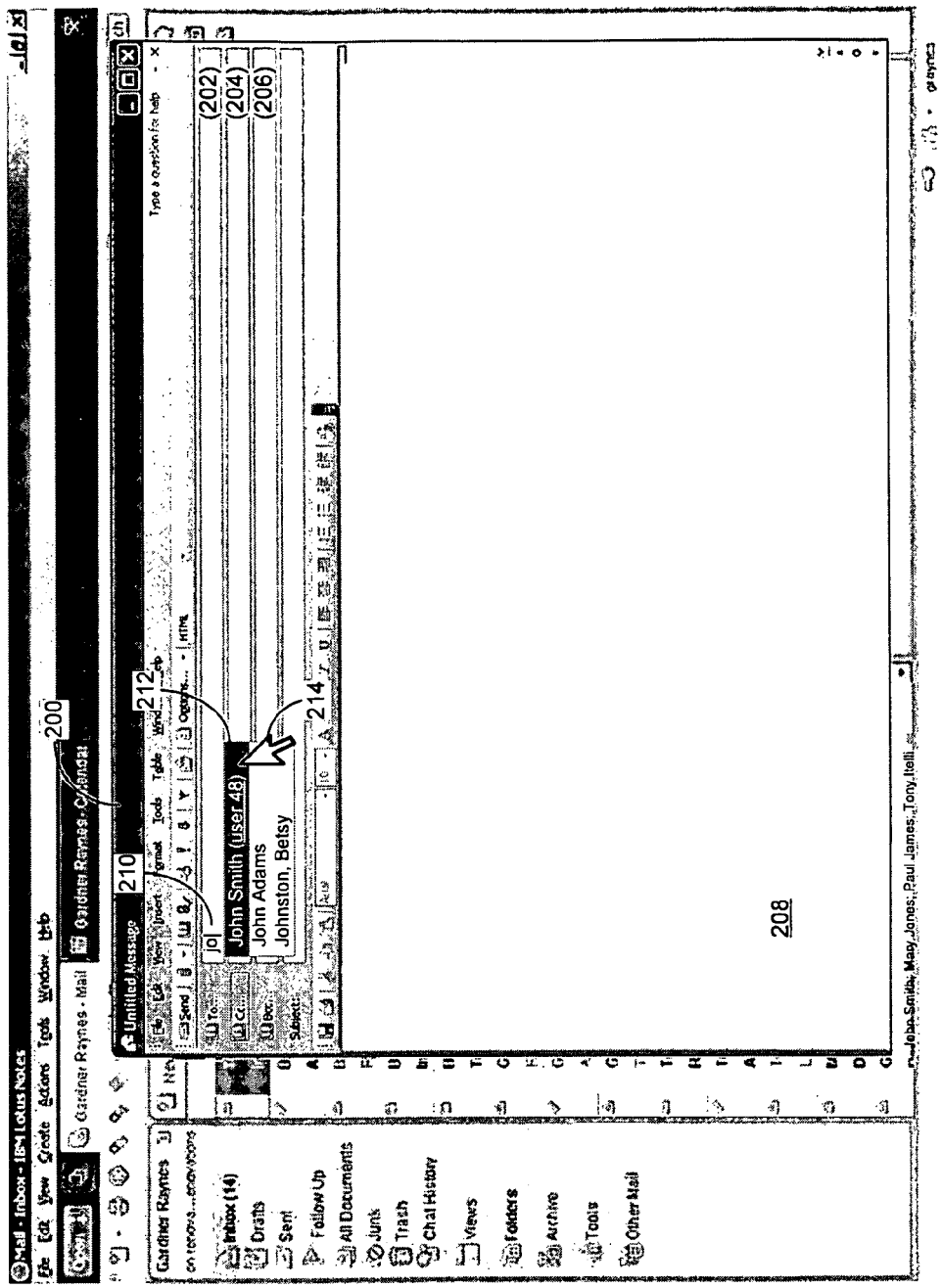
FIG. 4 is a display screen rendered by the name resolution process and/or a collaborative client application of FIG. 1.

For example, and referring also to FIG. 4, collaborative client application 22 may be a client email application that may allow (either alone or in conjunction with one or more of name resolution process 10 and/or collaborative server application 20) user 46 to generate email message 200. Email message 200 may be addressed to one or more recipients. As is known in the art, email message 200 may be addressed to "TO" recipients 202, "CC" (i.e., carbon copy) recipients 204, and "BCC" (i.e., blind carbon copy) recipients 206. Further, and as is know in the art, email message 200 may include message content 208 (i.e., the body of the email message).

Continuing with the above-described example, in one embodiment, name resolution process 10 may provide typeahead functionality by drawing upon the analyzed 102 social network for the user. For example, collaborative client application 22 may allow user 46 to address (e.g., using a keyboard; not shown) email message 200 to one or more "TO" recipients 202. Name resolution process 10 may receive 106 a name input 210 (i.e., "jo") from user 46 as user 46 types in a "TO" recipient 202 of email message 200. Name resolution process 10 may identify 104 a collaborative user (e.g., one or more "TO" recipients 202) based upon the received 106 name input and the social network of user 46 (e.g., reflected in social network graph 150)

Identifying 104 the collaborative user may include comparing 108 the name input received 106 from the user with the one or more relationship users (e.g., defined within social network graph 150). For example, as user 46 types in "TO" recipient 202 "jo", name resolution process 10 may compare 108 the received 106 name input (i.e., "jo") and to the relationship users defined within social network graph 150 (i.e., "John Smith", "Matt Barclay", "Mitch Burkhard", "Matt Herbert"). Name resolution process 10 may suggest 110 one or more relationship users based upon, at least in part, an alphabetic match between at least a portion of the name input (i.e., "jo") and at least a portion of a name of the one or more relationship users (i.e., "John Smith", "Matt Barclay", "Mitch Burkhard", "Matt Herbert").

For example, as shown in FIG. 4, name resolution process 10 (alone or in conjunction with one or more of collaborative client application 22 and/or collaborative server application 20) may render selection menu 212. Selection menu 212 may include one or more collaborative users based upon, at least in part, an alphabetic match between at least a portion of the received 106 name input (i.e., "jo") and at least a portion of a name of one or more relationship users. In the illustrated example, there is an alphabetic match between the received 106 name input "jo" and the relationship user "John Smith".

In addition to the relationship user "John Smith", name resolution process 10 (alone or in conjunction with one or more of collaborative server application 20 and/or collaborative client application 22), selection menu 212 may include one or more non-relationship users (e.g., "John Adams" and "Johnston, Betsy"). The one or more non-relationship users may be suggested based upon an alphabetic match between the received 106 name input and one or more users included within a contacts list (e.g., from corporate directory 64 residing on server computer 12, or other email contacts list). As shown, name resolution process 10 may prioritize the name listing for the relationship user (i.e., John Smith) over the suggested non-relationship users. User 46 may select a desired "TO" recipient 202 from suggestion menu 212 using onscreen pointer 214, which may be controlled by a pointing device (e.g., a mouse; not shown).

Figure 5:
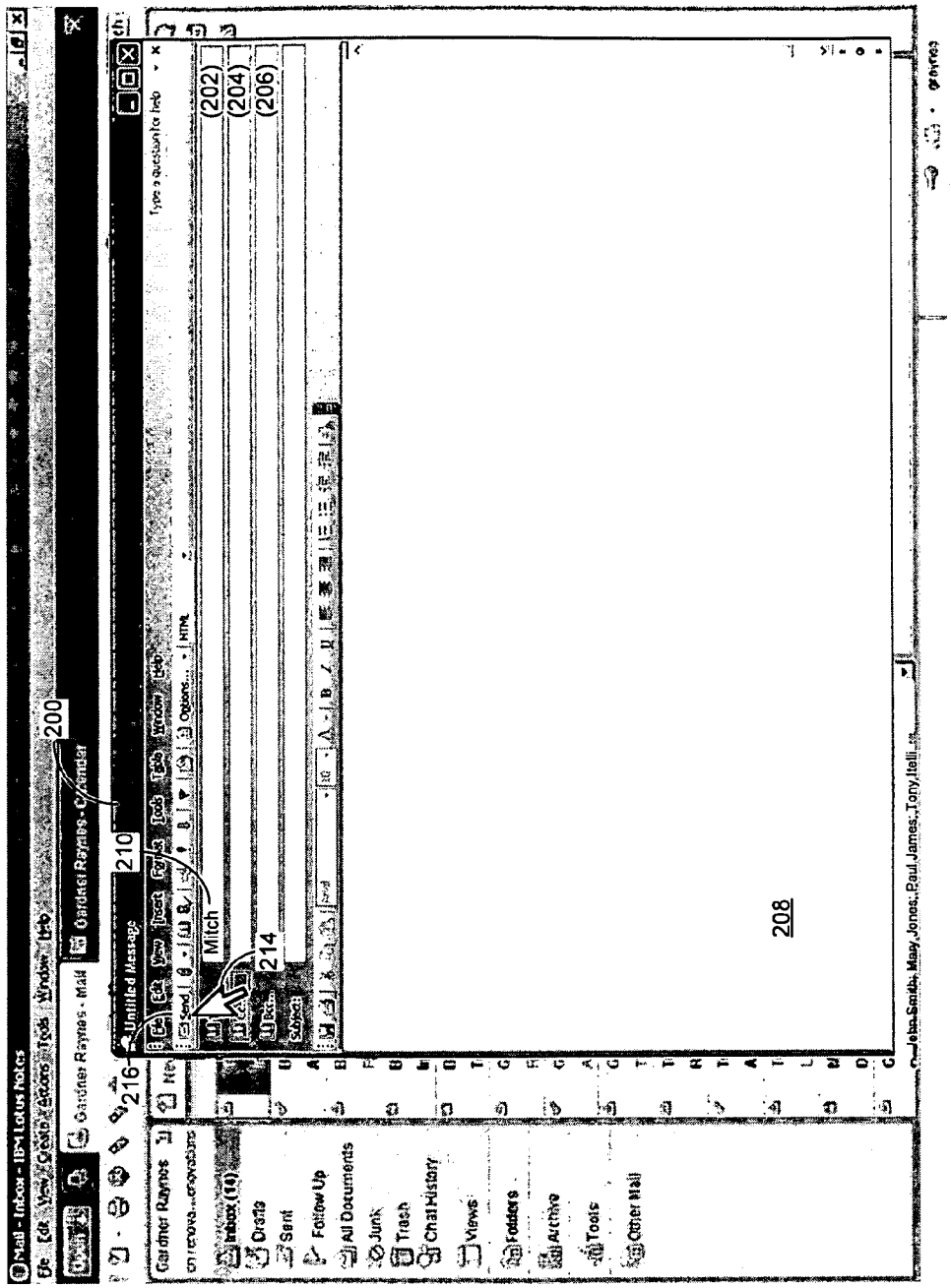
FIG. 5 is a display screen rendered by the name resolution process and/or a collaborative client application of FIG. 1.

Additionally/alternatively, the name input received 106 from the user may be replaced 112 with a network identifier of a relationship user based upon, at least in part, an alphabetic match between at least a portion of the name input and at least a portion of a name of the one or more relationship users. For example, and referring also to FIG. 5, email message 200 may be addressed to "TO" recipient 202 "Mitch" (e.g., name input by user 46). User 46 may send email 200 by selecting, via onscreen pointer 214, send button 216.

Upon selecting send button 216, name resolution process 10 (alone or in conjunction with one or more of collaboration server application 20 and/or collaboration client application 22) may receive 106 the name input (i.e., "Mitch") from user 46. Based upon, at least in part, the received 106 name input "Mitch" not being a valid network identifier (i.e., not being a valid email address), name resolution process 10, collaboration server application 20 and/or collaboration client application 22 may identify 104 a collaborative user based upon, at least in part, the name input received 106 from user 46 and the analyzed 102 social network for user 46. That is, a collaborative user may be identified 104 as being most relevant to user 46, from a social network perspective, based upon the name input "Mitch". Name resolution process 10 may compare 108 the name input ("Mitch") received 106 from user 46 to the one or more relationship users (i.e., "John Smith", "Matt Barclay", "Mitch Burkhard", "Matt Herbert") included in social network graph 150. The name input (i.e., "Mitch") may be replaced 112 with a network identifier of a relationship user based upon, at least in part, an alphabetic match between at least a portion of the name input and at least a portion of the name of the one or more relationship users.

Continuing with the foregoing example, the name input "Mitch" may match at least a portion of the relationship user "Mitch Burkhard". As such, name resolution process 10 (alone or in conjunction with collaboration server application 20 and/or collaboration client application 22) may replace the name input "Mitch" with a network identifier (e.g., email address) of the relationship user "Mitch Burkhard". The network identifier may be a unique identifier associated with the relationship user for a given collaborative application. The network identifier may include one or more of an email address, an instant messaging user identification, and a collaborative space user name, depending upon the type of collaborative application being used by user 46. In the exemplary context of email message 200, name resolution process 10 (alone or in conjunction with one or more of collaboration server application 20 and/or collaboration client application 22) may replace the name input "Mitch" with the email address corresponding to the relationship user "Mitch Burkhard" (i.e., user 52@xyz.com). As such, user 46 may address email 200 to the email address "user 52@xyz.com" by inputting (e.g., via a keyboard) only the first name of the relationship user "Mitch Burkhard".

Name resolution process 10 may further associate 114 a weighting parameter with one or more of the relationship users. The weighting parameter may be based upon, at least in part, a relationship frequency (e.g., how often the user and the relationship user interact), recentness (how recently the user and the relationship user have interacted), seniority of the relationship users (e.g., comparative seniority of several possible relationship users). Further, the weighting parameter may be based upon relationship type (e.g., relationships conducted via email may weight more heavily than relationships conducted via instant messaging). Additionally/alternatively, the weighting parameter may be based upon, at least in part, a user specified parameter (e.g., defined by user 46). For example, and referring back to FIG. 3, the weighting parameter 158 associated 114 with the one or more relationship users may be expressed, e.g., in social network chart 150. Various other mechanisms may be utilized for associating 114 the weighting parameter with one or more relationship user.

Figure 6:
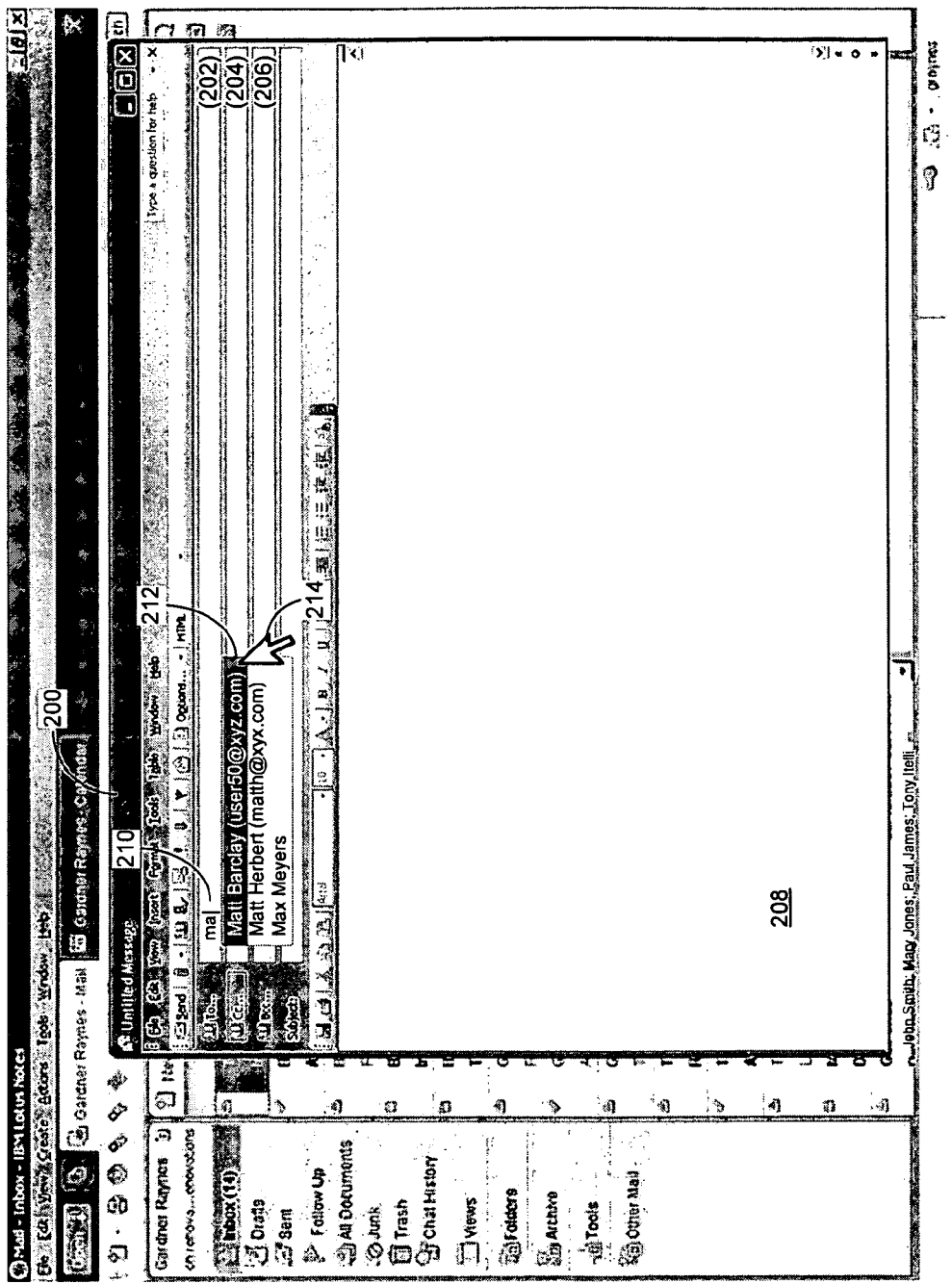
FIG. 6 is a display screen rendered by the name resolution process and/or a collaborative client application of FIG. 1.

Name resolution process 10 may prioritize the one or more relationship users based upon, at least in part, the weighting parameter associated 114 with the one or more relationship users. For example, and referring also to FIG. 6, collaboration client application 22 (alone or in conjunction with one or more of collaboration server application 20 and/or name resolution process 10) may allow user 46 to create email message 200. As user 46 begins to input (e.g., using a keyboard) a "TO" recipient 202, name resolution process 10 may compare 108 the name input (e.g., "ma") with the one or more relationship users defined in social network graph 150, and may suggest 110 one or more relationship users (e.g., based upon an alphabetic match between the name input and the names of the one or more relationship users).

For example, the name input "ma" may be an alphabetic match for at least a portion of the relationship users "Matt Barclay" and "Matt Herbert". Name resolution process 10 may suggest 110 the relationship users "Matt Barclay" and "Matt Herbert" based upon the at least partial match between the name input and the names of the relationship users. Further, name resolution process may prioritize the listing of relationship users based upon, at least in part, the weighting parameter associated 114 with each relationship user. Continuing with the above-stated example, the relationship user "Matt Barclay" may have an associated 114 weighting parameter of 7, while the relationship user "Matt Herbert" may have an associated 114 weighting parameter of 5. Accordingly, name resolution process 10 may prioritize the relationship user "Matt Barclay" ahead of the relationship user "Matt Herbert" in the suggested 110 relationship users.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:
1. A method comprising:
analyzing a plurality of relationships of a user;

analyzing a social network of the user based upon, at least in part, the plurality of relationships of the user to identify a plurality of relationship users;

assigning a weighting parameter to each relationship user in the plurality of relationship users, said weighting parameter being based on at least a mode of interaction between the user and the relationship user and an organizational relationship between the user and the relationship user; and selecting a collaborative user from the plurality of relationship users based upon, at least in part, a name input received from the user, the social network of the user, and the weighting parameter assigned to each of the relationship users.

2. The method of claim 1, wherein the plurality of relationships comprise at least one of email communications, instant messaging chats, voice communications, scheduled calendar events, and collaborative space interactions.

3. The method of claim 1, wherein the collaborative user comprises at least one of an email recipient, an instant messaging recipient, and a calendaring/scheduling participant.

4. The method of claim 1, wherein selecting a collaborative user based upon, at least in part, a name input received from the user, the social network of the user, and the weighting parameter assigned to each of the relationship users comprises:

comparing the name input received from the user with each of the relationship users, and selecting the collaborative user based upon, at least in part, an alphabetic match between at least a portion of the name input and at least a portion of a name of the collaborative user.

5. The method of claim 1, wherein selecting a collaborative user based upon, at least in part, a name input received from the user, the social network of the user, and the weighting parameter assigned to each of the relationship users comprises:

comparing the name input received from the user with each of the relationship users, and replacing the name input received from the user with a network identifier of one of the relationship users based upon, at least in part, an alphabetic match between at least a portion of the name input and at least a portion of a name of the one relationship user.

6. The method of claim 5, wherein the network identifier comprises at least one of an email address, and instant messaging user identification, a collaborative space user name.

7. The method of claim 1, wherein the weighting parameter is further based upon, at least in part, a relationship frequency between the user and the at least one of the relationship users.

8. The method of claim 1, wherein the weighting parameter is further based upon, at least in part, a user specified priority.

9. A computer program product comprising:

a computer readable storage medium having computer usable program code embodied therewith, the computer usable program code comprising:

computer usable program code configured to identify a plurality of relationships of a user;

computer usable program code configured to analyze a social network of the user based upon, at least in part, the plurality of relationships of the user to identify a plurality of relationship users;

computer usable program code configured to assign a weighting parameter to each relationship user in the plurality of relationship users, said weighting parameter being based on at least a mode of interaction between the user and the relationship user and an organizational relationship between the user and the relationship user; and computer usable program code configured to select a collaborative user from the plurality of relationship users based upon, at least in part, a name input received from the user, the social network of the user, and the weighting parameter assigned to each of the relationship users.

10. The computer program product of claim 9, wherein the plurality of relationships comprise at least one of email communications, instant messaging chats, voice communications, scheduled calendar events, and collaborative space interactions.

11. The computer program product of claim 9, wherein the collaborative user comprises at least one of an email recipient, an instant messaging recipient, and a calendaring/scheduling participant.

12. The computer program product of claim 9, wherein the computer usable program code configured to select a collaborative user based upon, at least in part, a name input received from the user, the social network of the user, and the weighting parameter assigned to each of the relationship users comprises:

computer usable program code configured to compare the name input received from the user with each of the relationship users, and computer usable program code configured to select the collaborative user based upon, at least in part, an alphabetic match between at least a portion of the name input and at least a portion of a name of the collaborative user.

13. The computer program product of claim 9, wherein the computer usable program code configured to select a collaborative user based upon, at least in part, a name input received from the user, the social network of the user, and the weighting parameter assigned to each of the relationship users comprises:

computer usable program code configured to compare the name input received from the user with each of the relationship users, and computer usable program code configured to replace the name input received from the user with a network identifier of one of the relationship users based upon, at least in part, an alphabetic match between at least a portion of the name input and at least a portion of a name of the relationship user.

14. The computer program product of claim 13, wherein the network identifier comprises at least one of an email address, an instant messaging user identification, and a collaborative space user name.

15. The computer program product of claim 9, wherein the weighting parameter is further based upon, at least in part, a relationship frequency between the user and the at least one of the relationship users.

16. The computer program product of claim 9, wherein the weighting parameter is further based upon, at least in part, a user specified priority.

* * * * *